(12) United States Patent
Vogel et al.

(10) Patent No.: US 9,505,296 B2
(45) Date of Patent: Nov. 29, 2016

(54) CLUTCH DEVICE HAVING AN ACTUATING DEVICE

(71) Applicant: Schaeffler Technologies GmbH & Co. KG, Herzogenaruach (DE)

(72) Inventors: Florian Vogel, Buhl (DE); Daniel Helmer, Achern-Fautenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 62 days.

(21) Appl. No.: 14/407,519

(22) PCT Filed: Jun. 5, 2013

(86) PCT No.: PCT/EP2013/061601
§ 371 (c)(1),
(2) Date: Dec. 12, 2014

(87) PCT Pub. No.: WO2013/186102
PCT Pub. Date: Dec. 19, 2013

(65) Prior Publication Data
US 2015/0122607 A1    May 7, 2015

(30) Foreign Application Priority Data

Jun. 13, 2012  (DE) .................. 10 2012 209 930
Aug. 29, 2012  (DE) .................. 10 2012 215 274

(51) Int. Cl.
*F16D 27/08* (2006.01)
*B60K 6/387* (2007.10)
(Continued)

(52) U.S. Cl.
CPC .................. *B60K 6/387* (2013.01); *B60L 7/28* (2013.01); *B60L 11/14* (2013.01); *B60L 15/2009* (2013.01);
(Continued)

(58) Field of Classification Search
CPC ......... B60L 7/28; H02K 7/104; B60K 6/387; F16D 2027/005
See application file for complete search history.

(56) References Cited

U.S. PATENT DOCUMENTS 2,644,905 A * 7/1953 Brueder ................ F16D 27/115
192/40
5,174,215 A * 12/1992 Barrows ............... B60L 15/005
104/288
(Continued)

FOREIGN PATENT DOCUMENTS

CN    101865218    10/2010
CN    101932844    12/2010
(Continued)

OTHER PUBLICATIONS

Unpublished German Patent Application 10 2011 088 473.4, filed on Dec. 14, 2011.

*Primary Examiner* — Richard Lorence
*Assistant Examiner* — Lillian Nguyen
(74) *Attorney, Agent, or Firm* — Volpe and Koenig, P.C.

(57) ABSTRACT

A clutch device having an actuating device, especially for a drive train of a motor vehicle which includes an internal combustion engine, an electrical machine with a stator and a rotor, and a transmission device. The clutch device can be arranged in the drive train between the internal combustion engine on the one side and the electrical machine and the transmission device on the other side. The clutch device and the actuating device are integrated into the rotor of the electrical machine and the actuating device includes an electrical eddy-current brake with a brake stator and a brake rotor, the brake rotor having at least one electromagnet with a coil and a core, the coil and the core being arranged concentrically in relation to each other.

9 Claims, 3 Drawing Sheets

(51) Int. Cl.
*H02K 49/04* (2006.01)
*B60L 7/28* (2006.01)
*B60L 11/14* (2006.01)
*B60L 15/20* (2006.01)
*F16D 21/06* (2006.01)
*F16D 27/00* (2006.01)
*F16D 23/12* (2006.01)

(52) U.S. Cl.
CPC ......... *B60L 15/2054* (2013.01); *F16D 21/06* (2013.01); *F16D 27/08* (2013.01); *H02K 49/046* (2013.01); *B60L 2240/421* (2013.01); *B60L 2240/486* (2013.01); *B60L 2240/507* (2013.01); *B60L 2270/145* (2013.01); *F16D 2023/123* (2013.01); *F16D 2027/005* (2013.01); *F16D 2500/501* (2013.01); *Y02T 10/641* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 6,253,885 B1 * | 7/2001 | Tsai | B60L 7/28 188/158 |
| 8,231,492 B2 | 7/2012 | Chen et al. | |
| 8,534,435 B2 | 9/2013 | Fenn et al. | |
| 2003/0019711 A1 | 1/2003 | Nekado et al. | |
| 2003/0106729 A1 * | 6/2003 | Noreikat | B60K 6/40 180/65.7 |
| 2003/0116391 A1 * | 6/2003 | Desta | B60L 7/28 188/267 |
| 2005/0261097 A1 * | 11/2005 | Klemen | B60K 6/26 475/5 |
| 2006/0226700 A1 * | 10/2006 | Liu | B60L 7/28 303/152 |
| 2008/0135680 A1 * | 6/2008 | Scelsi | F16D 55/36 244/111 |
| 2009/0182963 A1 | 7/2009 | Prahlad et al. | |
| 2011/0005883 A1 | 1/2011 | Krafft | |
| 2014/0361652 A1 * | 12/2014 | Gieras | H02K 49/043 310/105 |
| 2015/0122606 A1 * | 5/2015 | Vogel | F16D 23/12 192/20 |

FOREIGN PATENT DOCUMENTS

| | | | | |
|---|---|---|---|---|
| DE | 10230090 | | 1/2003 | |
| DE | 102008006 062 | | 2/2009 | |
| DE | 102010048830 | | 5/2011 | |
| DE | 102012219043 A1 * | | 4/2014 | ............ B60L 11/14 |
| EP | 2275701 | | 1/2011 | |
| FR | 68965 E * | | 8/1958 | ............ F16D 27/06 |
| GB | 15390 | | 0/1914 | |

* cited by examiner

Fig. 2

CLUTCH DEVICE HAVING AN ACTUATING DEVICE

BACKGROUND

The invention relates to a clutch device with an actuating device, particularly for the drive train of a motor vehicle, comprising an internal combustion engine, an electric machine with a stator and a rotor, and a transmission device, with the clutch device perhaps being arranged in the drive train between the internal combustion engine on the one side and the electric machine and the transmission device on the other side, with the clutch device and the actuating device being integrated in the rotor of the electric machine, and the actuating device comprising an electric eddy-current brake and a brake stator and a brake rotor.

A drive train in a motor vehicle is known from DE 10 2008 006 062 A1, comprising an internal combustion engine and a starter-generator, whereas via a starter clutch, running in oil, can generate the rotary connection in the flow of forces between the internal combustion engine, on the one side, and the starter-generator and the transmission, on the other side, with the rotor of the starter-generator, at least indirectly, being supported at the clutch cover and the clutch cover being connected in a torque-proof and oil-tight fashion to the clutch bell of the transmission, in order to design the drive train in a more cost-effective and space-saving fashion.

A clutch arrangement in a drive train of a motor vehicle is known from DE 10 2010 048 830 A1, comprising an internal combustion engine with a crankshaft and a transmission with a transmission input shaft with a first friction clutch including a first counter pressure plate and an axially displaceable first compression plate, received in a torque-proof fashion at the first counter pressure plate, which is stressed by a flat spring against the first counter pressure plate, with friction coatings being interposed, of a first clutch disk connected to the transmission input shaft in a torque-proof fashion, and with a second friction clutch comprising a second counter pressure plate and a compression plate, received axially displaceable and in a torque-proof fashion at the second counter pressure plate, which can be stressed in reference to a clutch disk in the direction towards the second counter pressure plate, with friction coatings being interposed, the clutch disk, connected to the transmission input shaft, in which the second counter pressure plate is connected in an effective fashion to the crankshaft, the first counter pressure plate is supported rotationally on the second counter pressure plate, and an axially effective ramp device is arranged between the first counter pressure plate and the second compression plate, in order to provide a greater capacity of the moment that can be transferred with lower actuating force.

A clutch device is known from the German patent application filed on Dec. 14, 2011, identified with the reference 10 2011 088 473.4, with an actuating device for a drive train of a motor vehicle comprising an internal combustion engine, an electric machine with a stator and a rotor, and a transmission device, with the clutch device being arranged in the drive train between the internal combustion engine on the one side and the electric machine and the transmission device on the other side, with the clutch device and the actuating device being integrated in the rotor of the electric machine in order to structurally and/or functionally improve the clutch device.

For more detailed information regarding the features of the present invention, here explicitly reference is made to the publication DE 10 2010 048 830 A1 and the German patent application with the reference 10 2011 088 473.4. The teachings of this publication and this patent application shall be considered as incorporated in the present document. Features of this publication and this patent application are therefore features of the present document.

SUMMARY

The invention is based on the objective to structurally and/or functionally improve the clutch device mentioned at the outset. In particular, an efficiency of the eddy-current brake shall be increased. In particular, a moment capacity shall be increased. In particular, the number of required magnets shall be reduced. In particular, an effective radius for generating a moment shall be enlarged. In particular, an effective magnetic area shall be increased. In particular, a magnetic flux within the eddy-current brake shall be increased. In particular, the brake moment shall be increased.

This objective is attained in a clutch device with an actuating device, particularly for a drive train of a motor vehicle comprising an internal combustion engine, an electric machine with a stator and a rotor, and a transmission device, with the clutch device perhaps being arranged in the drive train between the internal combustion engine, on the one side, and the electric machine and the transmission device, on the other side, the clutch device and the actuating device being integrated in the rotor of the electric machine, and the actuating device comprising an electric eddy-current brake with a brake stator and a brake rotor, in which the brake stator comprises at least one electromagnet with a coil and a core, with the coil and the core being arranged concentrically in reference to each other.

The internal combustion engine, the clutch device, the electric machine, and the transmission device can be arranged in the above-mentioned sequence in the drive train. A torsional vibration damper, particularly a two-weight flywheel, can be arranged in the drivetrain. The torsional vibration damper may comprise an input part, an output part rotational in reference to the input part, and at least one energy storage unit effective between the input part and the output part. The identifications "input part" and "output part" relate to the power flux originating in the internal combustion engine. The torsional vibration damper may be arranged in the drive train between the internal combustion engine and the clutch device. The torsional vibration damper may be arranged in the drive train between the internal combustion engine and the electric machine. The input part of the torsional vibration damper may be connected in a driving fashion to the internal combustion engine. The output part of the torsional vibration damper may be connected in a driving fashion to the clutch device. The output part of the torsional vibration damper may be connected in a driving fashion to the electric machine. At least one wheel, which can be driven, may be arranged in the drivetrain. At least one wheel, which can be driven, may be arranged in the drive train of the transmission device downstream in reference to the transmission device.

The motor vehicle may include a hybrid drive. The motor vehicle may have a first energy converter. The first energy converter may represent an internal combustion engine. The internal combustion engine may be operated with a hydrocarbon, such as gasoline, diesel, natural gas (liquefied natural gas, LNG, or compressed natural, CNG) or gasoline (liquefied petroleum gas, LPG). The internal combustion engine may be operated with hydrogen. The motor vehicle may include a first energy storage unit. The first energy storage may be a fuel tank. The motor vehicle may have a second energy converter. The second energy converter may be an electric motor. The electric machine may be operated as an electric motor. The electric machine may be operated as a generator. The electric machine may structurally combine an electric motor and a generator. The electric machine may be a starter-generator. The motor vehicle may have a second energy storage unit. The second energy storage unit may be an electric energy storage unit. The second energy storage unit may be an accumulator. The second energy storage unit may be a battery. The energy converters may serve to drive the motor vehicle. The use of the energy converter may allow generating mechanical performance. The motor vehicle may include a parallel hybrid drive. The motor vehicle may include a full hybrid drive.

The clutch device may be a friction clutch. The clutch device be a dry clutch. The clutch device may comprise a single-disk clutch. The clutch device may comprise a wet clutch. The clutch device may comprise a multi-disk clutch. The clutch device may comprise a multi-plate clutch. The clutch may comprise a coupling. The clutch device may comprise a compressed clutch. The clutch device may comprise a drawn clutch. The clutch device may comprise compression plate. The clutch device may comprise at least one interim pressure plate. The clutch device may include a pressure plate. The clutch device may have at least one clutch disk. The at least one clutch disk may have friction coatings. Here, interim pressure plates and clutch plates may be arranged alternating. At least one clutch disk may be clamped between the compression plate, at least one interim pressure plate, and/or the pressure plate.

The clutch device may be arranged in the drive train between the internal combustion engine and the electric machine. The clutch device may be arranged in the drive train between the internal combustion engine and the rotor of the electric machine. The clutch device may comprise an input part and an output part. The identifications "input part" and "output part" relate the power flux in the direction towards a wheel of the motor vehicle that can be driven. The input part of the clutch device may include at least one clutch disk. The input part of the clutch device may be connected in a driving fashion to the internal combustion engine. The output part of the clutch device may include a compression plate, at least one interim pressure plate, and/or the pressure plate. The output part of the clutch device may be connected in a driving fashion to the electric machine. The output part of the clutch device may be connected in a driving fashion to the rotor of the electric machine. The clutch device may be arranged in the drive train between the internal combustion engine and the transmission device. The output part of the clutch device may be connected in a driving fashion to the transmission device. The output part of the clutch device may be connected in a driving fashion to the input shaft of the transmission device. The clutch device may be arranged in the drive train between the torsional vibration damper and the electric machine. The input part of the clutch device may be connected in a driving fashion to the torsional vibration damper. The input part of the clutch device may be connected in a driving fashion to the output part of the torsional vibration damper. The clutch device may be arranged in the drive train between the torsional vibration damper and the transmission device.

Starting at a completely disengaged operating position, in which essentially no power transfer occurs between the input part and at least one output part, up to a completely engaged operating position, in which essentially a complete power transfer occurs between the input part and at least one output part, the clutch device, increasing power transfer is possible depending on the actuation, with the power transfer between the input part and at least one output part occurring in a form-fitting fashion particularly in a friction-fitting fashion. Inversely, starting at a completely engaged operating position, in which essentially a complete power transfer occurs between the input part and at least one output part, up to a completely disengaged operating position, in which essentially no power transfer occurs between the input part and at last one output part, depending on the operation, reducing power transfer shall be possible. A completely engaged operating position can be a closed operating position. A completely disengaged operating position can be an open operating position.

The clutch device may have a moment sensor. The moment sensor may be arranged at the input part of the clutch device. The moment sensor may include an input part, an output part, rotational in reference to the input part, and at least one energy storage unit effective between the input part and the output part. A moment may be detected based on a relative rotation between the input part and the output part opposite a force of the energy storage unit. Using the moment sensor a controlled actuation of the clutch device may occur.

The transmission device may have an input shaft and an output shaft. The identifications "input shaft" and "output shaft" relate to a power flux starting at the internal combustion engine or the electric machine. The transmission device may be a stepped transmission. The transmission device may include a continuous variable gear. The transmission device may have a double-clutch. The transmission device may include a converter-clutch transmission. The transmission may be manually actuated. The transmission device may be automatically actuated. The input shaft may be connected in a driving fashion to the electric machine. The input shaft may be connected in a driving fashion to the rotor of the electric machine. The input shaft may be connected in a driving fashion to the clutch device. The input shaft may be connected in a driving fashion to the output part of the clutch device. The output shaft may be connected in a driving fashion to at least one wheel that can be driven.

The electric machine may comprise a housing. The stator may be arranged fixed in reference to the housing. The stator may be arranged radially outside the rotor. The electric machine may comprise at least one shaft or hub. The rotor may be arranged fixed at least at a shaft or a hub. The rotor may be arranged radially inside the stator. The electric machine may have a first shaft or hub or a second shaft or hub. The first shaft or hub and the second shaft or hub may be arranged coaxially. The rotor may be arranged fixed at the second shaft or the hub. The first shaft or hub may be allocated to the input part of the clutch device. The second shaft or hub may be allocated to the output part of the clutch device. The rotor may have a sheath-like form. The rotor may have a tubular form. The rotor may have a hollow-cylindrical form. A receiving chamber may be formed inside the rotor.

A clutch device integrated in the rotor may be a clutch device, which is arranged at least essentially inside the rotor. A clutch device integrated in the rotor may be a clutch device, which is arranged, at least essentially, radially inside the rotor. A radial direction is a direction perpendicular in reference to the axis of rotation of the electric machine. A clutch device integrated in the rotor may be a clutch device which is arranged, at least essentially, axially inside the rotor. An axial direction is a direction of extension of an axis of rotation of the electric machine. An actuating device integrated in the rotor may be an actuating device, which is at least essentially arranged inside the rotor. An actuating device integrated in the rotor may be an actuating device at least essentially arranged radially inside the rotor. An actuating device integrated in the rotor may be an actuating device, which at least essentially is axially arranged inside the rotor. The clutch device and the actuating device may be sectionally arranged in a nested fashion. The actuating device may be arranged sectionally on a side facing the internal combustion engine. The clutch device may sectionally be arranged on a side facing the transmission device. The actuating device may be arranged sectionally on the radial inside. The clutch device may be arranged sectionally at the radial outside.

The compression plate of the clutch device may be axially displaceable with the help of the actuating device. The clutch device can be opened or closed with the help of the actuating device. The clutch device may be engaged or disengaged with the help of the actuating device. The actuating device may be self-reinforcing. This allows a switching of a comparatively high work force with a comparatively low actuating force. Here, an actuating force may be self-reinforcing. Thus, a lower actuating energy is required in order to engage and/or disengage the clutch device. Here, reduced actuating force is required. Here, a shorter actuating stroke is required. An actuator may have a reduced power. An actuator may have a reduced power input. An actuator may have a reduced structural space. An actuator may have a reduced weight. A switching speed may be increased.

The actuating device may have an adjustable ramp device with first ramps and second ramps. The ramp device may be adjustable by way of rotation. The first ramps and the second ramps may be rotational in reference to each other. A rotation of the first ramps and the second ramps in reference to each other may lead to a change of an axial distance. Roller bodies, particularly balls, may be arranged between the first ramps and the second ramps. The ramps may form running lanes for the roller bodies. The ramps may be embodied as roller body ramps, particularly as ball ramps. The ramps may be arranged distributed in the circumferential direction of the clutch device. The ramps may be inclined in reference to a plane perpendicular in reference to an axis of rotation of the clutch device. The ramps may be inclined and/or declined in the circumferential direction of the clutch device. The ramps may be rising unilaterally. The ramps may be rising at both sides. The first ramps and the second ramps may be embodied geometrically complementary in reference to each other. The first ramps may correspond to the second ramps such that in the event of a rotation of the first ramps and the second ramps in reference to each other the first ramps and the second ramps move away from each other or towards each other in the direction of extension of the axis of rotation of the clutch device. The first ramps may support the roller bodies radially from the inside. The second ramps may support the roller bodies radially from the outside. The roller bodies may have such a diameter that they are held captive between the first ramps and the second ramps. The roller bodies may be arranged in roller body cage. This way an allocation of the roller bodies to the ramps is ensured.

The actuating device may include an epicyclical gear comprising a ring, a sun gear, planetary wheels, and a rod. The epicyclical gear may represent a planetary gear. The ring may have internal gears. The sun gear may have external gears. The planetary wheels may respectively have external gears. The planetary wheels may respectively engage the ring and/or the sun gear. The epicyclical gear may comprise a first gear shaft, a second gear shaft, and a third gear shaft. The ring may be arranged at the first gear shaft. The sun gear may be arranged at the second gear shaft. The planetary wheels may be arranged at the third gear shaft. The first gear shaft and the second gear shaft may have coaxial axles. The axles of the third gear shafts may be arranged parallel in reference to the axes of the first gear shaft and the second gear shaft and distanced therefrom. During operation of the epicyclical gear the planetary wheels may travel around the sun gear. The rod may represent a planetary wheel support. The rod may be connected fixed to the third gear shafts or comprise the third gear shafts.

The first ramps may be allocated to the ring and the second ramps may be allocated to the rod. The first ramps may be connected fixed to the ring, the second ramps may be connected via at least one flat spring to the rod in a torque-proof fashion and axially pre-stressed and the rod may be connected fixed to the rotor. The ramp device may comprise a first ramp ring. The first ramp ring may comprise the first ramps. The first ramp ring may initially be designed separately and subsequently connected to the ring. The first ramps may be integrated in the ring. The first ramps may represent sections of the ring. The ramp device may comprise a second ramp ring. The second ramp ring may comprise the second ramps. The second ramp ring may initially be designed separately and subsequently connected to the rod. At least one flat spring may represent a tension spring. At least one flat spring may have a circular form. At least one flat spring may be connected to the first ramp ring, on the one side, and to the second ramp ring, on the other side. Using at least one flat spring the ramp device can be impinged with a preload. The rod may be produced in one piece with the rotor. The rod and the rotor may initially be produced structurally separately and subsequently connected to each other.

The epicyclical gear may comprise pairs of planetary wheels with first planetary wheels to form a first transmission with a sun gear and second planetary wheels to form a second transmission with a ring. A first planetary wheel and a second planetary wheel may be allocated to each other respectively. The planetary wheels allocated to each other may be arranged coaxially in reference to each other. The planetary wheels may be arranged axially distanced from each other. The planetary wheels allocated to each other may be connected to each other in a torque-proof fashion. The first planetary wheels may have a greater diameter than the second planetary wheels. This increases the transmission ratio of the epicyclical gear.

The actuating device may comprise a moment sensor, for a controlled adjustment of the ramp device and a freewheel device, and the moment sensor and the freewheel device may be arranged at least sectionally overlapping in the radial direction. The freewheel device may comprise an interior ring and an exterior ring. The freewheel device may comprise a clamping body. The clamping body may act between the interior ring and the exterior ring. Rotating the interior ring and the exterior ring in reference to each other may be possible with the use of the freewheel device in a first direction of rotation and blocked in a second direction of rotation, opposite in reference to the first direction of rotation. The interior ring may be allocated to a shaft or a hub of the electric machine. The exterior ring may be allocated to the sun gear of the epicyclical gear. This way a self-regulation of the actuating device is possible in the completely engaged operating position of the clutch device. The internal combustion engine can operate in a boosting fashion. The moment sensor may comprise at least one moment spring, particularly a helical pressure spring, and the moment spring and the freewheel device may be arranged at least partially overlapping in the radial direction.

The eddy-current brake may utilize the eddy-current loss of the brake rotor moved in the magnetic fields for the purpose of braking. The electromagnets of the brake stator may serve to generate magnetic fields. The brake rotor may be electrically conductive. An air gap may be formed between the brake stator and the brake rotor. The eddy-current brake may serve to engage the clutch device. An electric control device may be provided to control the eddy-current brake. The sun gear with a moment acting opposite a rotation of the epicyclical gear may be impinged with the help of the eddy-current brake such that the ring with the first ramps and the rod with the second ramps are rotated in reference to each other. The coil may have a rotary-symmetrical form. The coil may have a coil axis. The core may have a rotary-symmetrical form. The core may have a core axis. The coil axis may and the core axis may be arranged at least almost superimposable.

In the clutch device according to the invention, an efficiency of the eddy-current brake is increased. A moment capacity is increased. A number of magnets required are reduced. An effective radius for generating a moment is increased. An effective magnetic area is increased. A magnetic flux within the eddy-current brake is increased. A brake moment is increased by alternating magnetic fields.

The coil may have a hollow-cylindrical form. The core may have a pot-like form with an E-shaped cross-section. The core may have a washer-like gap. The coil may be received in the core. The coil may be received in the gap of the core. The coil may be received in the core at least almost entirely. The core may comprise a core section, which is arranged radially inside the coil. The core may comprise a wall section, which is arranged radially outside the coil. The core may comprise a floor section, which encloses the gap unilaterally. The coil and the core may have a common axle, which is arranged parallel in reference to the axis of rotation of the rotor. This way the magnetic field can penetrate the brake rotor in a perpendicular direction.

The brake stator may have a disk section and at least one electromagnet may have a base section, and the electromagnet may be arranged with its base section at the disk section of the brake stator. The disk section may have a radially exterior edge. The brake stator may have a hub section. From the disk section, the hub section may be aligned towards the brake rotor. At least one electromagnet may comprise a face pointing towards the brake rotor. The faces of the electromagnets may be arranged at least approximately in one plane. The brake stator may comprise several, particularly approximately ten to approximately fourteen, particularly approximately twelve electromagnets arranged distributed in the circumferential direction. The electromagnets may be arranged evenly distributed in the circumferential direction. The electromagnets may be arranged distributed in a circular fashion. The electromagnets may limit an interior circle and an exterior circle. The electromagnets may be arranged in the radial direction between the hub section of the brake stator and the radially exterior edge of the disk section.

The brake rotor may comprise a disk section and the disk section of the brake rotor may cover at least almost completely at least one electromagnet in the radial direction. The disk section of the brake rotor may comprise a radially exterior edge. The radially exterior edge of the disk section of the brake rotor may have a diameter, which is equivalent or greater than the exterior circle limited by the electromagnets. The disk section of the brake rotor and the plane of the faces of the electromagnets may be arranged at least almost parallel in reference to each other. An air gap may be formed between the disk section of the brake rotor and the plane of the faces of the electromagnets.

The brake rotor may comprise a sprocket section and the sprocket section may be arranged directly at the disk section of the brake rotor. The sprocket section may form a sun gear. The sprocket section and the disk section may be produced in one piece. The sprocket section and the disk section may be initially produced as separate structures and subsequently connected to each other. This way, less structural space is required in the axial direction.

Summarizing and in other words here a rotor-integrated clutch results, among other things, from the invention, comprising an electric actuation eddy-current brake with a pot magnet integrated in the rotor. The efficiency of the eddy-current brake can be increased with coils acting as pot magnets. The eddy-current brake may be designed with pot magnets, which are located on a carrier. Here, they can be bolted to the back of an effective diameter of the eddy-current brake. A greater effective diameter can be realized by the type of the magnets. The pot magnets ensure an easier guidance of the magnetic flux lines. This results in a great magnetic flux density, which leads to stronger eddy-currents in the disk.

Here, "may" particularly indicates optional features of the invention. Accordingly, an exemplary embodiment of the invention results, which has the respective feature or the respective features.

In the following, exemplary embodiments of the invention are described in greater detail with reference to the figures. Additional features and advantages are discernible from this description. Concrete features of these exemplary embodiments may have general features of the invention. Features of these exemplary embodiments combined with other features may also represent individual features of the invention.

BRIEF DESCRIPTION OF THE DRAWINGS

It is shown schematically and as an example.

DETAILED DESCRIPTION OF THE PREFERRED EMBODIMENTS

Figure 1:
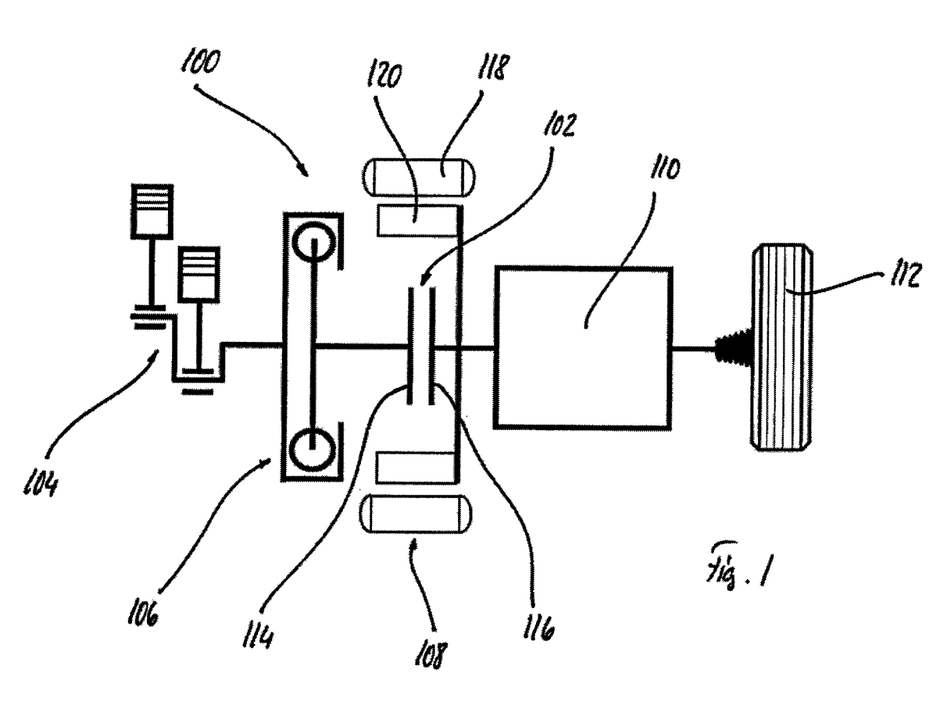
FIG. 1 a drive train of a motor vehicle with a parallel full-hybrid drive and a clutch arranged in the drive train, FIG. 2 a clutch integrated in a rotor of an electric machine with an actuating device comprising an eddy-current brake for a motor vehicle comprising a hybrid drive, FIG. 3 an eddy-current brake with a brake stator and a brake rotor, and FIG. 4 a brake stator with an eddy-current brake with pot magnets.

FIG. 1 shows a drive train 100 of a motor vehicle, not shown in greater detail here, comprising a parallel full-hybrid drive and a clutch 102 arranged in the drive train 100. The drive train 100 comprises an internal combustion engine 104, a two-weight flywheel 106, the clutch 102, an electric machine 108, a transmission 110, and at least one wheel 112, which can be driven. The electric machine 108 can be operated as a motor. The clutch 102 is arranged in the drive train 100 between the two-weight flywheel 106 and the electric machine 108. The clutch 102 is arranged in the drive train 100 between the two-weight flywheel 106 and the transmission 110.

The clutch 102 comprises an input part 114 and an output part 116. The input part 114 of the clutch 102 is connected to the two-weight flywheel 106. The output part 116 of the clutch 102 is connected to the electric machine 108. The electric machine 108 comprises a stator 118 and a rotor 120. The output part 116 of the clutch 102 is connected to the rotor 120 of the electric machine 108. The output part 116 of the clutch 102 is connected to the transmission 110. The electric machine 108 is connected to the transmission 110. The rotor 120 of the electric machine 108 is connected to the transmission 110.

Figure 2:
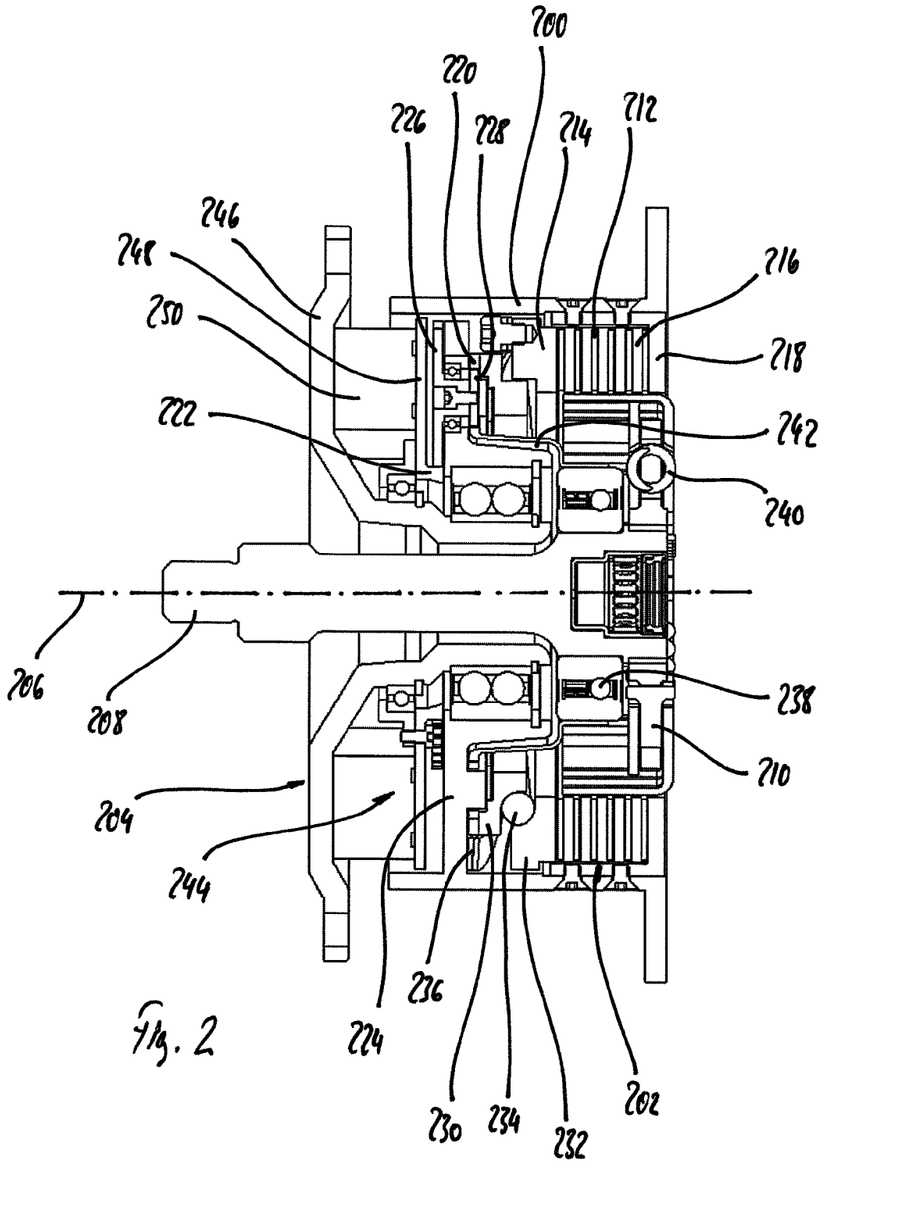

FIG. 2 shows a clutch 202, such as the clutch 102 according to FIG. 1, integrated in a rotor 200, such as the rotor 120 according to FIG. 1 of an electric machine, otherwise not shown in greater detail here, such as the electric machine 108 according to FIG. 1, comprising an actuating device 204 for a motor vehicle with a hybrid drive. The clutch 202 is arranged in the radial direction inside the rotor 200 and aligned in a direction of extension of the rotary axis 206. The actuating device 204 is arranged in the radial direction inside the rotor 200 and aligned in the direction of extension of the rotary axle 206. The clutch 202 and the operating device 204 are arranged in a nested fashion in reference to each other. The clutch 202 is arranged at the side of the internal combustion engine. The actuating device 204 is arranged at the side of the transmission.

The clutch 202 comprises an input part and an output part. The input part comprises a shaft 208, a moment sensor 210, and clutch disks, for example 212. The output part of the clutch 202 comprises a compression plate 214, interposed pressure plates, such as 216, and a pressure plate 218. The clutch disks 212 are connected to a shaft 208 in a torque-proof fashion. The compression plate 214, the interposed pressure plates 216, and the pressure plate 218 are connected to the rotor 200 in a torque-proof fashion. The compression plate 214 is axially displaceable to a limited extent in the direction of extension of the rotary axle 206.

The actuating device 204 comprises an epicyclical gear with a ring 220, a sun gear 222, planetary wheels, and a rod 224. The ring 220 comprises an interior gear. The sun gear 222 comprises an exterior gear. The planetary wheels respectively comprise an exterior gear. The epicyclical gear comprises first planetary wheels, such as 226, which form with the sun gear 222 a first transmission. The epicyclical gear comprises second planetary wheels, such as 228, which form with the ring 220 a second transmission. The first planetary wheel 226 and the second planetary wheel 228 are respectively connected to each other in a torque-proof fashion. The first planetary wheels 226 each have a greater diameter than the second planetary wheels 228. The planetary wheels 226, 228 are supported in the rod 224.

The actuating device 204 comprises a ramp device with a first ramp ring 230 and a second ramp ring 232. The first ramp ring 230 comprises first ramps. The second ramp ring 232 comprises second ramps. The first ramp ring 230 and the second ramp ring 232 can be rotated in reference to each other. Roller bodies, such as 234, are arranged between the first ramp ring 230 and the second ramp ring 232. Any rotation of the ramp rings 230, 232 in reference to each other leads to a change of the distance between the ramp rings 230, 232. The ramp rings 230, 232 are connected to each other via planetary wheels. The first ramp ring 230 is connected fixed to the ring 220. The second ramp ring 232 is connected to the rod 224 in a torque-proof fashion and axially displaceable in reference to the rod 224. The second ramp ring 232 is connected to the rod 224 with the help of ring-shaped flat springs, such as 236. The flat springs 236 act as tension springs between the rod 224 and the ramp ring 232. The rod 224 is connected fixed to the rotor 200.

The actuating device 204 comprises the moment sensor 210 and a freewheel 238. The moment sensor 210 serves for the controlled adjustment of the ramp device. The moment sensor 210 comprises an input part and an output part. The input part of the moment sensor 210 is connected in a torque-proof fashion to a shaft 208. The output part of the moment sensor 210 is connected in a torque-proof fashion to the clutch disks 212. Helical pressure springs, such as 240, are effective between the input part and the output part of the moment sensor 210. The freewheel 238 comprises an interior ring and an exterior ring. The freewheel 238 comprises clamping bodies. The interior ring of the freewheel 238 is connected in a torque-proof fashion to the shaft 208. The exterior ring of the freewheel 238 is connected in a torque-proof fashion to the sheath-shaped part 242, which corresponds to the second planetary wheels 228. The moment sensor 210 and the freewheel 238 are arranged side-by-side in the direction of extension of the axis of rotation 206. The moment sensor 210 and the freewheel 238 overlap in the radial direction. The helical pressure springs 240 and the freewheel 238 sectionally overlap in the radial direction. The input part of the moment sensor 210 and the interior ring of the freewheel 238 initially comprise almost identical interior diameters. The moment sensor 210 and the freewheel 238 are arranged inside the clutch 202 in the direction of extension of the axis of rotation 206. The moment sensor 210 and the freewheel 238 are arranged radially inside the clutch 202.

The actuating device 204 comprises an eddy-current brake 244. The eddy-current brake 244 comprises a brake stator 246 and a brake rotor 248. The brake stator 246 and the brake rotor 248 are arranged side-by-side in the direction of extension of the axis of rotation 206. The brake stator 246 is arranged at the side towards the internal combustion engine. The brake stator 246 comprises several electromagnets, such as 250, having a coil and a core. The brake stator 246 is connected fixed to the rotor 200. The brake rotor 248 is connected in a torque-proof fashion to the sun gear 222. This way, a preliminary control moment for activating the clutch 202 can be introduced via the sun gear 222. The epicyclical gear is arranged such that the preliminary control moment is amplified.

The clutch 202 is opened during the pure electric drive. The ring 220, the rod 224, the planetary wheels 226, 228, and the run gear 222 travel with the same speed (E-motor rotation), the epicyclical gear is quasi "interlocked". This way, any rotation of the ramp rings 230, 232 and the operating of the clutch 202 is prevented. Additionally, any influence of rotary accelerations are almost eliminated by the parts rotating with the ring 220, on the one side, and the parts rotating with the sun gear 222, on the other side, respectively having approximately the same inertia.

If the internal combustion engine is to be started, here a preliminary control moment for the clutch 202 is generated by the eddy-current brake 244 upon the run gear 222. This moment is a brake moment and counteracts the original rotary motion. The sun gear 222 is rotated in reference to the previously stationary epicyclical gear. By the function of the epicyclical gear the ring 220 and thus also the ramp ring 230 are rotated in reference to the rod 224, which simultaneously is equivalent to a rotation of the ramp device and the engagement of the clutch 202.

The preliminary control moment of the eddy-current brake 244 is transmitted by the transmission at the epicyclical gear and the ramp rings 230, 232 such that the internal combustion engine can be started with the required moment. The preliminary control moment can be precisely controlled via the power supply to the eddy-current brake 244 and generated in a very short period of time. The starting period of the internal combustion engine amounts to a few milliseconds. From the high transmission of the moment and the short actuating period a low actuating energy results for starting the internal combustion engine. Furthermore, the eddy-current brake 244 operates without wear and tear and via the magnetic field of the E-magnets 250 it can realize arbitrary intermediate stages of the requested moment without any fluctuations in moment and dependencies of friction values.

When the internal combustion engine is operating, the preliminary control moment is generated via the internal combustion engine itself and the freewheel 238. The shaft 208 serves to connect to the internal combustion engine. In this operating status the clutch 202 transmits a moment in the direction of tension. A certain part of this tension moment is used via the freewheel 238 as a preliminary control moment for the part 242. This way the clutch 202 is actuated by a part of the moment of the internal combustion engine via the epicyclical gear on the ramp rings 230, 232. The clutch disks 212 are clamped between the compression plate 214, the interposed pressure plates 216, and the pressure plate 218 and transmit the requested moment. The angle of rotation of the ramp rings 230, 232 is controlled via the moment sensor 210. This also allows for the clutch 202 to disengage as soon as no moment is transmitted any longer. By this arrangement of the parts the clutch 202 is self-regulating in this state and requires no additional external energy for actuation. In this state operating conditions, such as load shifts, boosts, and driving with the internal combustion engine are possible. A boost operation of the internal combustion engine is also possible in the system. Here, the eddy-current brake 244 is running in permanent operation.

Figure 3:
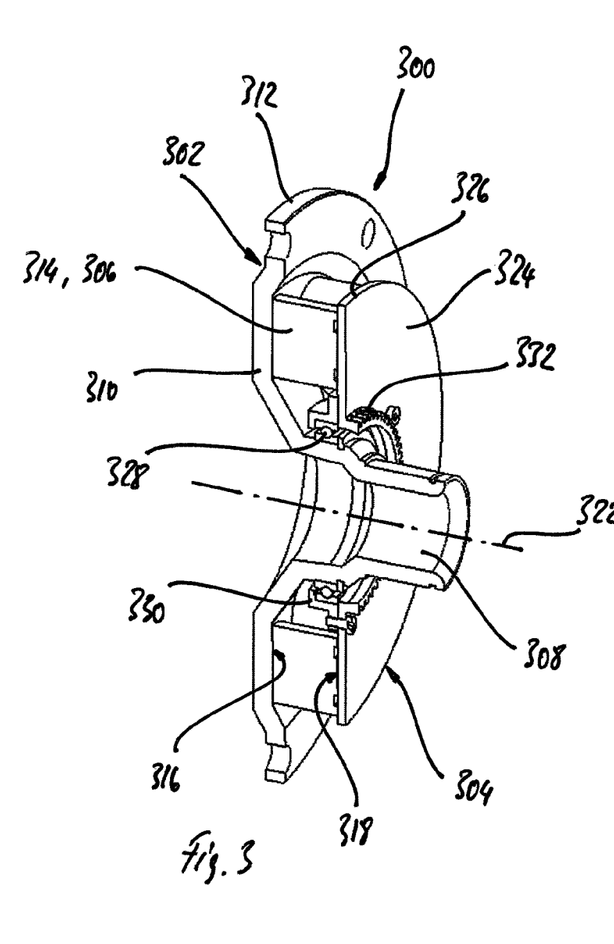
Figure 4:
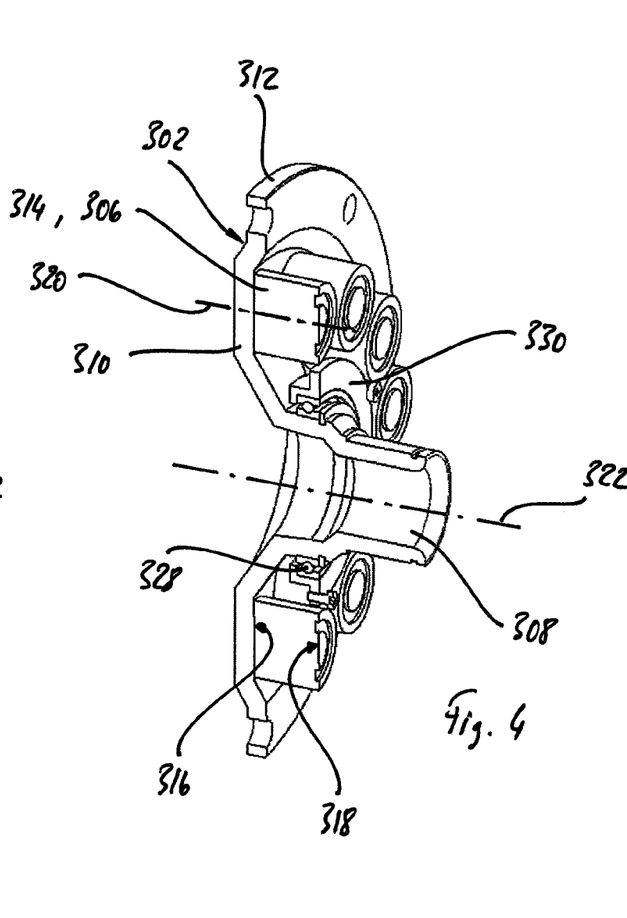

FIG. 3 shows an eddy-current brake 300, such as the eddy-current brake 244 according to FIG. 2, with a brake stator 302 and a brake rotor 304. FIG. 4 shows the brake stator 302 of the eddy-current brake 300 with pot magnets, such as 306.

The brake stator 302 comprises a hub section 308. The brake stator 302 comprises a disk section 310. The disk section 31 extends from at the hub section 308 radially outwardly. The disk section 310 comprises a radially exterior edge 312. Electromagnets, such as 314, are arranged at the disk section 310. The electromagnets 314 each comprise a base 316 and a face 318. The electromagnets 314 are arranged at the disk section 310 evenly distributed in the circumferential direction. In the present case, the brake stator 302 comprises twelve electromagnets 314. The electromagnets 314 each comprise an axle 320. The electromagnets 314 are arranged with their axles 320 on a central circle, concentric in reference to an axle 322 of the brake stator 302. The electromagnets 314 limit an exterior circle radially outwardly and an interior circle radially inwardly.

The electromagnets 314 each comprise a coil and a core. The cores each have a pot-like form with an E-shaped cross-section. The cores respectively have a washer-shaped receiver for a coil. The coils respectively have a hollow-cylindrical form. The coils are respectively positioned in a receiver of a core. The cores respectively have a core section, which is arranged radially inside a coil. The cores respectively have a wall section, which surrounds the coil radially at the outside. The cores respectively have a floor section, which limits the receiver at the base. The electromagnets 314 are respectively bolted with their bases 316 at the disk section 310. The faces 318 of the electromagnets 314 are positioned in a common plane.

The brake rotor 304 comprises a disk section 324. The disk section 324 comprises a radially exterior edge 326. The disk section 324 of the brake rotor 304 covers the electromagnets 314 in the radial direction such that the edge 326 is arranged radially outside the exterior circle limited by the electromagnets 314. The disk section 324 of the brake rotor 304 is arranged parallel in reference to the plane of the faces 318 of the electromagnets 314. A bearing 328 is arranged between the brake stator 320 and the brake rotor 304. The bearing 328 is a radial bearing. The bearing 328 comprises an interior ring and an exterior ring. The interior ring is arranged at the hub section 308 of the brake stator 302. The brake rotor 304 comprises a counterpart 330 for fastening at the exterior ring of the bearing 328.

A small air gap is formed between the faces 318 of the electromagnet 314 and the disk section 324 of the brake rotor 304. The disk section 324 is made from an electrically conductive material. A magnetic field can be generated with the help of electromagnets 314. The magnetic field penetrates the disk section 324 of the brake rotor 304 essentially in the direction of extension of the axles 320.

The brake rotor 304 comprises a sprocket section 332. The sprocket section 332 is arranged at the transmission side at the disk section 324. The sprocket section 332 forms a sun gear of an epicyclical gear. The disk section 324 and the sprocket section 332 are produced in one piece.

LIST OF REFERENCE CHARACTERS

100 Drive train
102 Clutch
104 Internal combustion engine
106 Two-weight flywheel
108 Electric machine
110 Transmission
112 Wheel
114 Input part
116 Output part
118 Stator
120 Rotor
200 Rotor
202 Clutch
204 Actuating device
206 Axis of rotation
208 Shaft
210 Moment sensor
212 Clutch disk
214 Compression plate
216 Interposed pressure plate
218 Pressure plate
220 Ring
222 Sun gear
224 Rod
226 First planetary wheel
228 Second planetary wheel
230 First ramp ring
232 Second ramp ring
234 Roller body
236 Flat spring
238 Freewheel
240 Helical pressure spring
242 Part 244 Eddy-current brake
246 Brake stator
248 Brake rotor
250 Electromagnet
300 Eddy-current brake
302 Brake stator
304 Brake rotor
306 Pot magnet
308 Hub section
310 Disk section
312 Edge
314 Electromagnet
316 Base
318 Face
320 Axle
322 Axle
324 Disk section
326 Edge
328 Bearing
330 Counterpart
332 Sprocket section

The invention claimed is:

1. A clutch device comprising an actuating device for a drive train of a motor vehicle including an internal combustion engine, an electric machine with a stator and a rotor and a transmission device, the clutch device is arrangeable in the drive train between the internal combustion engine, on one side, and the electric machine as well as the transmission device, on another side, the clutch device and the actuating device are integrated in the rotor of the electric machine, and the actuating device comprises an electric eddy-current brake with a brake stator and a brake rotor, the brake stator comprises at least one electromagnet with a coil and a core, with the coil and the core being arranged concentrically in reference to each other, the coil and the core have a common axis, which is arranged parallel in reference to an axis of rotation of the rotor and the common axis is arranged offset from the axis of rotation of the rotor.

2. The clutch device according to claim 1, wherein the coil has a hollow-cylindrical form.

3. The clutch device according to claim 1, wherein the core has a pot-shaped form with an E-shaped cross-section.

4. The clutch device according to claim 1, wherein the coil is received in the core.

5. The clutch device according to claim 1, wherein the brake stator comprises a disk section, and the at least one electromagnet comprises a base section, and the at least one electromagnet is arranged with its base section on a disk section of the brake stator.

6. The clutch device according to claim 1, wherein the at least one electromagnet comprises a face pointing towards the brake rotor.

7. The clutch device according to claim 1, wherein the brake stator comprises several electromagnets arranged distributed in a circumferential direction.

8. The clutch device according to claim 1, wherein the brake rotor comprises a disk section with a radially exterior edge, and the disk section of the brake rotor covers the at least one electromagnet in a radial direction such that the radially exterior edge is arranged radially outside a radially exterior circle defined by the at least one electromagnet.

9. The clutch device according to claim 8, wherein the brake rotor comprises a sprocket section, and the sprocket section is arranged directly at the disk section of the brake rotor.

* * * * *